United States Patent [19]

Fujita et al.

[11] 4,386,295

[45] May 31, 1983

[54] CERAMIC LUMINESCENT DEVICE

[75] Inventors: Yosuke Fujita, Ashiya; Fumio Fukushima; Yoji Fukuda, both of Hirakata; Tsuneharu Nitta, Katano, all of Japan

[73] Assignee: Matsushita Electric Industrial Co., Ltd., Osaka, Japan

[21] Appl. No.: 150,655

[22] Filed: May 16, 1980

[30] Foreign Application Priority Data

May 16, 1979 [JP] Japan .................................. 54-60187

[51] Int. Cl.³ ............................................ H01J 29/10
[52] U.S. Cl. ...................................... 313/463; 357/10
[58] Field of Search .................. 357/10; 313/398, 463, 313/464, 480

[56] References Cited

U.S. PATENT DOCUMENTS 4,035,819  7/1977  Nitta et al. ............................. 357/10

OTHER PUBLICATIONS

Howard; IBM Technical Disclosure Bulletin; 7425, vol. 19, No. 10, Mar. 1977.

*Primary Examiner*—Eli Lieberman
*Attorney, Agent, or Firm*—Wenderoth, Lind & Ponack

[57] ABSTRACT

A ceramic luminescent device, in which a luminescent screen of zinc sulfide layer with luminescent impurities is formed on a translucent zinc oxide sintered body, and the luminescent light emitted from said luminescent screen is derived through said zinc oxide body.

The device can be constructed in a manner that said luminescent screen is excited either by an electric field or electron beam.

6 Claims, 3 Drawing Figures

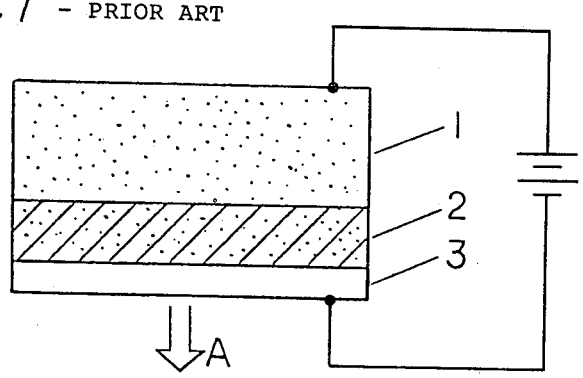
Fig. 1 - PRIOR ART
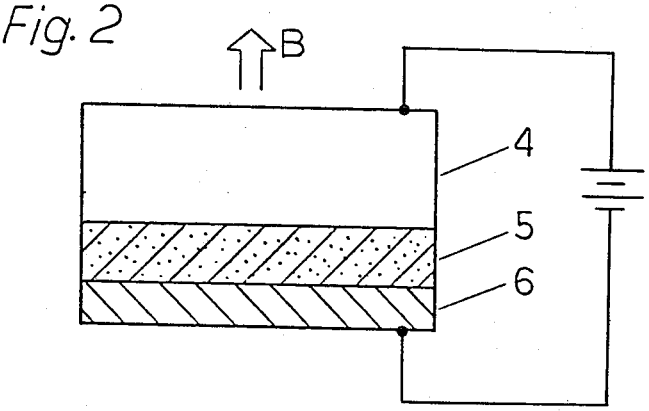
Fig. 2
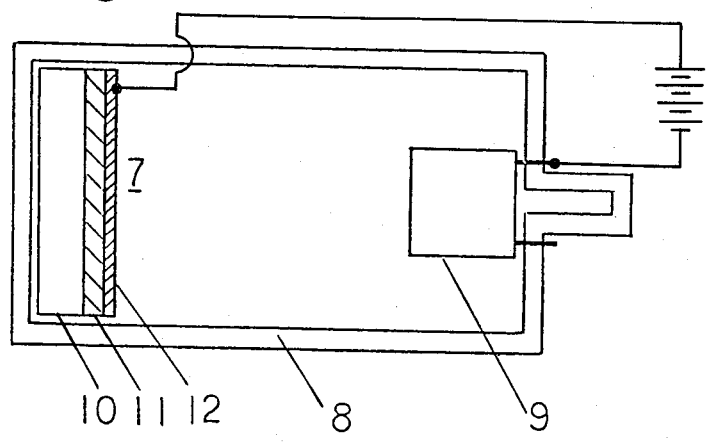
Fig. 3

CERAMIC LUMINESCENT DEVICE

BACKGROUND OF THE INVENTION

This invention relates to a luminescent device and more particularly relates to such a device using a luminescent ceramic material in the form of a luminescent screen.

Zinc sulfide phosphor material has hitherto been used widely in many kinds of luminescent devices and has been supplied in powdery form or thin film.

For example, an electroluminescent device using a powder zinc sulfide phosphor is constructed in such a manner that a zinc sulfide powder is dispersed in an organic embedding resin, the dispersion is coated on a glass plate provided with a transparent electrode of such material as tin oxide to form thereon a phosphor layer, and a metal electrode is further superimposed. Such a device is disadvantageous in that because a dispersing medium is employed, the efficiency of light emission is low and the useful life is short.

An electroluminescent device using a thin film phosphor is structurally complicated in that it comprises, in a laminar arrangement, a glass substrate, a transparent electrode, a dielectric layer, a zinc sulfide thin film, a dielectric layer and a metal electrode. Therefore, its manufacture requires a high degree of skill and a high production cost. It is further disadvantageous in that high operating voltage is required. Thus the prior art device can be used only in very limited applications.

We previously found a luminescent body which is composed of a zinc oxide sintered body and a zinc sulfide luminescent layer formed on the zinc oxide body by sulfurizing the zinc oxide (U.S. Pat. No. 4,035,819). This luminescent device is simple and quite easy to manufacture. Further it does not require high operating voltage and exhibits high brightness.

In such device, however, the zinc oxide body has dark body color because luminescent impurities are also contained therein, and so emitted light can come out only through the zinc sulfide layer. Further, when this device is used as an electroluminescent device, a transparent electrode made of expensive material such as tin oxide or gold is necessarily attached to the zinc sulfide layer.

SUMMARY OF THE INVENTION

It is an object of this invention to provide a ceramic luminescent body in which luminescent light is efficiently derived.

It is another object of the invention to provide a ceramic luminescent body which can be used to construct an improved electroluminescent device of simple structure.

To achieve the above mentioned objects, a ceramic luminescent body according to this invention has a construction such that a zinc sulfide luminescent layer is formed on a translucent zinc oxide sintered body and emitted light is derived through the zinc oxide body.

BRIEF DESCRIPTION OF THE DRAWINGS

FIG. 1 is a cross-sectional view of an electroluminescent device of conventional type;

FIG. 2 is a cross-sectional view of an electroluminescent device according to this invention; and FIG. 3 is a cross-sectional view of a cathode ray tube according to this invention.

DETAILED DESCRIPTION OF THE INVENTION

The zinc oxide sintered body is obtained at a low cost and can endure heat treatment at a temperature more than 1,100° C. A colorless and translucent zinc oxide sintered body can be prepared by using a high purity zinc oxide powder as the raw material and improved sintering technique. By composing a luminescent device of such translucent zinc ozide sintered body and zinc sulfide luminescent layer formed on the zinc oxide sintered body, the emitted light can be derived through the zinc oxide sintered body. Therefore it is possible that the luminescent device is excited by electron beam from the zinc sulfide layer's side to emit luminescent light through the zinc oxide body with sufficient efficiency. Thus the luminescent device of the invention is applicable to a luminescent screen of a cathod ray tube. Further such zinc oxide sintered body has a low specific resistance not over 10 $\Omega$.cm. Therefore when the thus prepared luminescent device is used as an electroluminescent device, the zinc oxide sintered body can work as an electrode, so that a conventional expensive transparent electrode becomes unnecessary.

In the luminescent device according to the invention, since it is not necessary to derive luminescent light from the zinc sulfide layer's side, a reflection film may be placed on the zinc sulfide layer. The reflection film reflects the half part of the luminescence, so as to increase the brightness at the zinc oxide body's side.

The transmittance in the zinc oxide sintered body is preferably greater than 60%.

The zinc sulfide layer contains at least one impurity selected from Cu, Ag, Au, Mn, Tb, Al and Cl, as luminescent elements. The impurity elements are deposited on the zinc oxide sintered body by vacuum evaporation, and then the zinc oxide sintered body is heated in a sulfurizing atmosphere such as carbon disulfide, whereby the surface layer of the zinc oxide is converted to the zinc sulfide in a uniform thickness, and at the same time the impurity elements are diffused into the zinc sulfide layer to form the luminescent layer. The luminescent impurities do not diffuse into the zinc oxide sintered body due to the difference of diffusion constants between zinc oxide and zinc sulfide. The zinc sulfide luminescent layer may be deposited on the zinc oxide sintered body by vacuum deposition or r.f. sputtering. A part of the zinc sulfide may be substituted by zinc selenide, cadmium sulfide, cadmium selenide, etc., which forms a solid solution with zinc sulfide.

An electroluminescent device embodying this invention is explained hereinafter.

FIG. 1 illustrates a luminescent screen of a conventional electroluminescent device, in which numeral 1 represents a zinc oxide sintered body having a dark body color, on the zinc oxide sintered body 1 is formed a zinc sulfide luminescent layer 2, and on the zinc sulfide layer 2 is deposited a tin oxide transparent electrode 3. FIG. 2 illustrates a luminescent screen of an electroluminescent device according to this invention, in which numeral 4 represents a translucent zinc oxide sintered body, on the zinc oxide sintered body 4 is formed a zinc sulfide luminescent layer 5, and on the zinc sulfide layer 5 is deposited an aluminium electrode 6. The zinc sulfide layers 2 and 5 contain copper and manganese as luminescent impurities. Dotted areas in FIGS. 1 and 2 are the areas where such impurities of copper and manganese are contained. In the conventional device of FIG. 1, the impurities are also introduced into the zinc oxide sintered body 1, which gives the zinc oxide sintered body the dark color. The aluminium electrode 6 also works as a reflection layer.

When a D.C. voltage is applied between the zinc oxide sintered body and the electrode with the zinc oxide body used as a positive electrode, after the forming process, a brilliant orange luminescent light is emitted from the zinc sulfide luminescent layer 2 or 5. Arrows A and B show the direction of the light emission from the luminescent screens of FIGS. 1 and 2, respectively. When the transmittance of the zinc oxide sintered body 4 is 80%, the luminescent device of this invention exhibits a brightness about 1.5 times as high as that of the conventional device.

Examples of production of the luminescent screen according to this invention are described in the following.

EXAMPLE 1

Commercial zinc oxide powder and a small amount of distilled water were mixed. The mixture was molded under a pressure of about 800 Kg/cm$^2$ into a disc having a diameter of 15 mm and a thickness of 0.4 mm. The disc was then fired at a temperature of 1200° C. for 2 hours in air to obtain a zinc oxide sintered body. The density of this ceramic was 95% of the theoretical value. On the one side of thus obtained zinc oxide ceramic disc were deposited manganese and copper metal to thicknesses of 200 Å and 40 Å, respectively. Then the disc was heated at 700° C. for 3 hours in a quartz tube, in which it was sulfidized with a stream of carbon disulfide with gaseous nitrogen as the carrier gas. Thereafter the disc is heated at 900° C. for 1 hour in nitrogen atmosphere.

Thus obtained disc assumed an orange body color at the side to which manganese and copper were deposited, while the body color of the other portion stayed white. By the heat treatment, the surface layer of zinc oxide ceramic was converted to zinc sulfide. The thickness of the zinc sulfide layer was about 10 $\mu$m. The inner part of the disc remained zinc oxide.

The zinc sulfide layer without copper or manganese was removed by rapping. Then an aluminium film was deposited on the zinc sulfide luminescent layer to a thickness of 2000 Å.

When D.C. voltage of 40 V was applied between the aluminium film and the zinc oxide body, with the zinc oxide body used as a positive electrode, orange luminescence having the brightness of 110 fL was observed.

EXAMPLE 2

By well-known sheet forming technique, high grade zinc oxide powder was made into a raw sheet with a thickness of 200 $\mu$m. After evaporating organic solvent and resin in air, the raw sheet was heated at a temperature of 1250° C. for 2 hours to obtain a zinc oxide ceramic sheet. The average grain size thereof was 6 $\mu$m and the density was 97% of the theoretical value. Then manganese and copper metal were deposited on one side of the sheet to thicknesses of 150 Å and 25 Å, respectively. Thereafter the sheet was heated at a temperature of 750° C. for 2 hours in a mixed gas of carbon disulfide and nitrogen, and then heated at 850° C. for 2 hours in nitrogen. Aluminium film was deposited to a thickness of 2000 Å on the manganese and copper doped surface of the zinc sulfide layer. When D.C. field of 45 V was applied across the device, with the zinc oxide ceramic used as a positive electrode, orange luminescence having the brightness of 140 fL was observed. The transmittance of the zinc oxide sintered body to the orange light was about 80%. The electric resistivity of the zinc oxide ceramic was 1.5 $\Omega$.cm.

An application of the invention to a cathode ray tube is described hereinafter.

An example of a cathode ray tube according to this invention is illustrated in FIG. 3, wherein a luminescent sheet 7 is installed in a vacuum enclosure of glass 8. In the vacuum enclosure 8 is also mounted an electron gun 9. The luminescent sheet 7 is composed of a translucent zinc oxide sintered body 10, a zinc sulfide luminescent layer 11 formed on the zinc oxide sintered body 10, and an aluminium film 12 deposited on the zinc sulfide layer 11, and mounted in the manner that the zinc oxide sintered body 10 faces to a face panel of the cathode ray tube.

The luminescent sheet 7 was prepared as follows:

A sintered sheet of zinc oxide was prepared by the same procedure as in Example 2. Aluminium and copper were deposited on one side of the sheet to thicknesses of 25 Å and 10 Å, respectively. Then the sheet was heated at a temperature of 1000° C. for 2 hours in hydrogen sulfide to convert the surface layer of the sheet into zinc sulfide layer. An aluminium film was deposited on the zinc sulfide layer to a thickness of 400 Å.

Thus constructed cathode ray tube emitted a green light by the irradiation of the electron beam from the electron gun 9. Since the aluminium film was thin, the light emission was obtained under low excitation voltage such as 4 KV.

What is claimed is:

1. A ceramic luminescent device comprising:
   a translucent, electrically conductive zinc oxide sintered body;
   a luminescent layer of zinc sulfide containing a luminescent impurity formed on said zinc oxide sintered body; and
   an electrode layer deposited on said luminescent layer, said electrode layer having the capability of reflecting light.

2. A ceramic luminescent device as claimed in claim 1, wherein the transmittance of said zinc oxide sintered body for luminescent light is greater than 60%.

3. A ceramic luminescent device as claimed in claim 1, wherein said zinc sulfide luminescent layer contains at least one luminescent impurity selected from the group consisting of Cu, Ag, Au, Mn, Tb, Al and Cl.

4. A ceramic luminescent device as claimed in claim 1, wherein said zinc sulfide luminescent layer contains Mn and Cu as luminescent impurities.

5. A luminescent apparatus comprising a luminescent device as claimed in claim 1 and an exciting means for supplying an exciting voltage between said zinc oxide sintered body and said electrode layer.

6. A luminescent apparatus as claimed in claim 5, wherein said exciting means includes an electron beam source which irradiates said luminescent device with an electron beam from the electrode layer side of said luminescent device.

* * * * *